United States Patent

Kuska

[15] 3,638,409
[45] Feb. 1, 1972

[54] FRUIT PICKER

[72] Inventor: Henry Kuska, 2810 South Harvey, Berwyn, Ill. 60402

[22] Filed: Aug. 12, 1970

[21] Appl. No.: 63,154

[52] U.S. Cl. ................................................56/339
[51] Int. Cl. ..............................................A01g 19/08
[58] Field of Search ..........................56/332, 339, 340

[56] References Cited

UNITED STATES PATENTS

| 65,279 | 5/1867 | Rogers | 56/339 |
|---|---|---|---|
| 595,034 | 12/1897 | Beatty | 56/339 |
| 79,455 | 6/1868 | Evans | 56/340 |
| 3,449,896 | 6/1969 | Burgess | 56/339 |
| 1,105,302 | 7/1914 | Pindell | 56/340 |
| 740,292 | 9/1903 | Libby | 56/339 |
| 2,900,780 | 8/1959 | Kaiser | 56/339 |

Primary Examiner—Russell R. Kinsey
Attorney—Prangley, Clayton, Mullin, Dithmar & Vogel

[57] ABSTRACT

A fruit picker includes a container having an open end, a handle on the container and a slotted stripper member on the open end of the container. An individual holds the handle to raise the container into position to encompass a piece of fruit. The container is then moved laterally to cause the stem to enter the slot, whereupon the individual pulls downwardly causing the piece of fruit to bear against the interior surface of the stripper member until it becomes separated and falls into the container.

1 Claims, 6 Drawing Figures

PATENTED FEB 1 1972
3,638,409
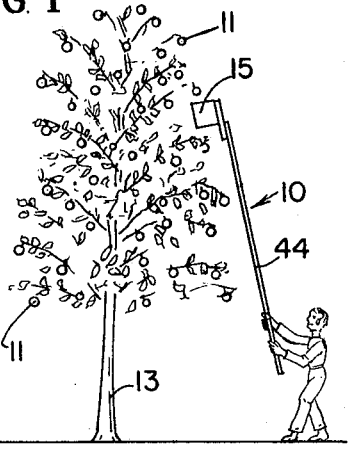
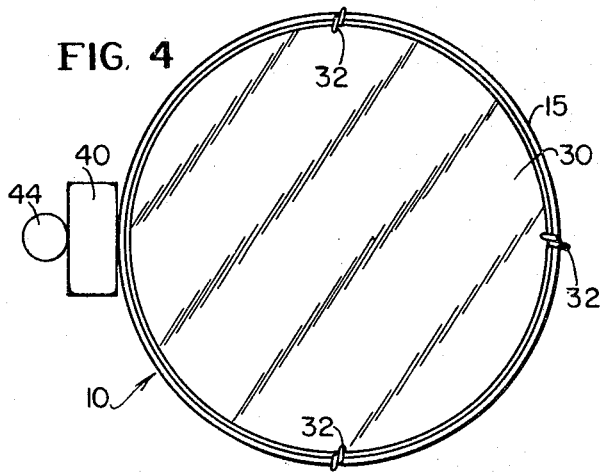
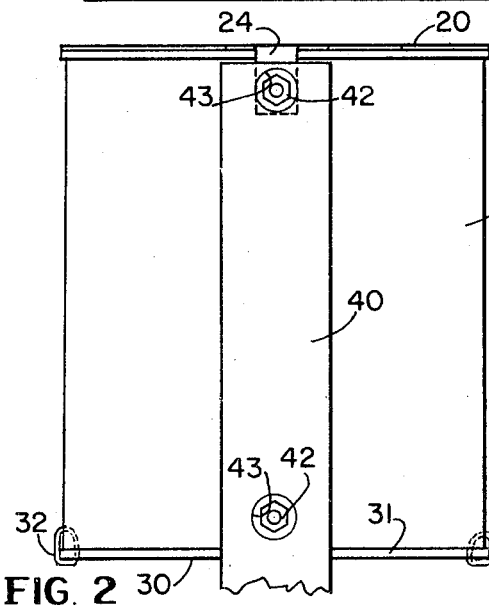
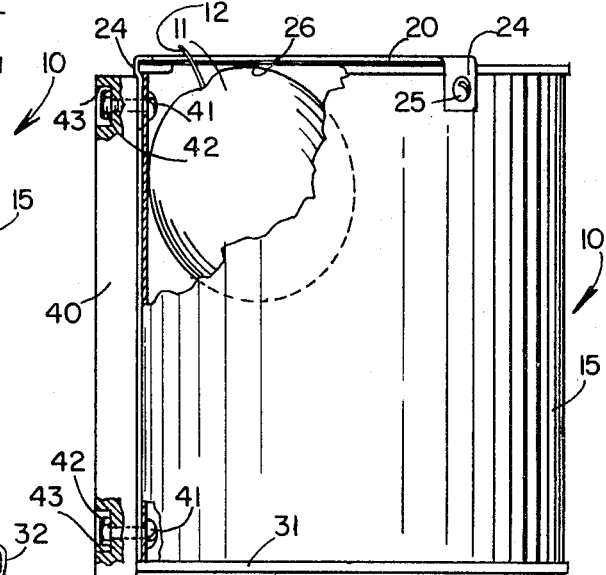
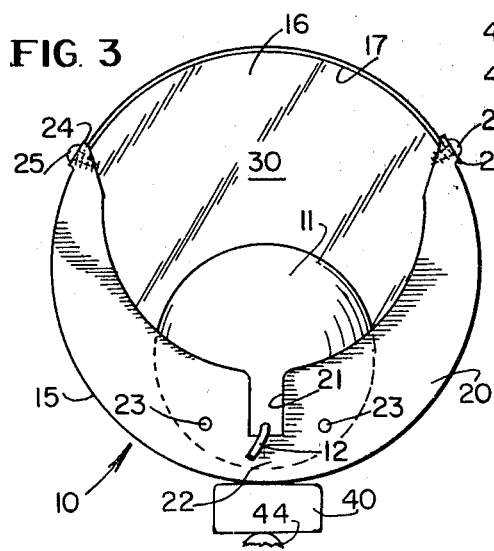
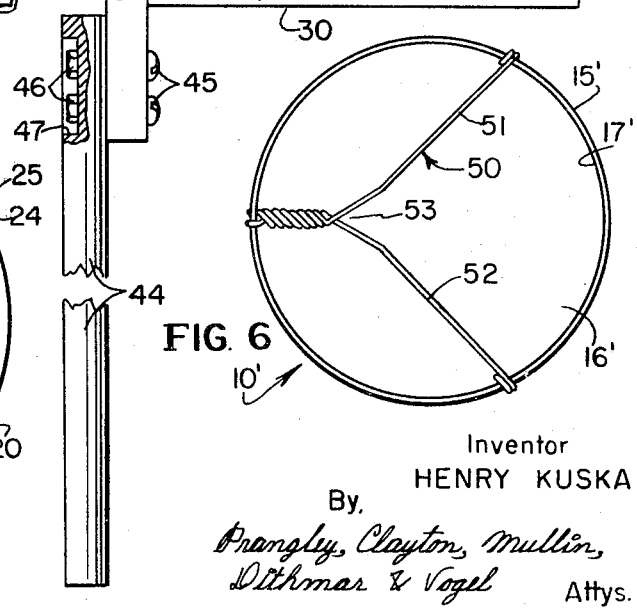
Inventor
HENRY KUSKA
By,
Prangley, Clayton, Mullin,
Dithmar & Vogel  Attys.

FRUIT PICKER

BACKGROUND OF THE INVENTION

In the past, fruit has been picked off of trees by hand, therefore necessitating a ladder to obtain fruit higher than the reach of the individual. Of course, if the branches of the tree extend over a stream or other inaccessible place, the fruit could not be picked. Alternatively, the tree or branches thereof may be shaken to cause the fruit to fall, which undesirably results in damage to the fruit.

It has been proposed to use a pole with a hook on one end, which hook is moved into position over the piece of fruit and pulled down. The disadvantage of this type of device, however, is that the fruit, particularly at the higher reaches of the trees must fall a considerable distance and is therefore likely to be bruised or otherwise damaged if it hits the ground or even if caught. When a container was used to catch the falling fruit, it would miss the container, or strike its edge, or fall into the container, but in all cases would be bruised or damaged. Because of the likelihood that the fruit will simply fall on the ground and be left, orchard owners have been reluctant to allow persons to use any kind of mechanical device to pick the fruit.

SUMMARY OF THE INVENTION

It is therefore a primary object of this invention to provide a fruit picker which minimizes the chances of fruit falling to the ground.

Another object of the invention is to provide a fruit picker which will enable removal of fruit from the higher reaches of a tree.

Still another object of the invention is to provide a fruit picker which includes a container to catch the fruit when it is separated from the tree.

Yet another object of the present invention is to enable home construction of a fruit picker by utilizing parts available at home and providing the rest of the parts in a saleable kit.

In summary, there is provided a fruit picker comprising a container having an open end, a handle on the container, and a stripper member attached to the container at the open end thereof and having a slot for receiving the stem of a piece of fruit, the member defining an abutment which faces the interior of the container against which abutment the fruit engages, the container in use being raised to encompass the fruit, and then moved laterally to place the stem of the fruit in the slot and finally pulled down to separate the fruit and permit it to fall into the container.

BRIEF DESCRIPTION OF THE DRAWINGS

FIG. 1 is a view of an apple tree and an individual utilizing a fruit picker incorporating therein the features of the present invention to remove apples from the tree;

FIG. 2 is an enlarged elevational view of the fruit picker, only the top portion of the handle having been shown;

FIG. 3 is a top plan view of the fruit picker of FIG. 2, showing an apple in position to be separated;

FIG. 4 is a bottom plan view of the fruit picker;

FIG. 5 is a side-elevational view of the fruit picker with a portion of the sidewall thereof having been removed to expose the apple as it is being separated; and FIG. 6 is a top plan view of a fruit picker incorporating an alternative embodiment of the present invention.

DETAILED DESCRIPTION OF THE PREFERRED EMBODIMENTS

Referring now to the drawings and more particularly to FIG. 1 thereof there is shown a fruit picker 10 held by an individual to remove apples 11 from an apple tree 12. The height of such a tree may be 20 feet or more. The details of construction of the fruit picker 10 may be seen in FIG. 2 to 5, the fruit picker 10 comprising a container such as a can 15 having an open end 16. In this form of the invention, the can 15 is cylindrical and defines a cylindrical inside surface 17. The fruit picker 10 also comprises a stripper plate 20, which in the form shown has a crescent shape. The outside edge of the stripper plate 20 is substantially circular and conforms to the circular shape of the can 15. In the form shown, the inside surface of the stripper plate 20 is also circular in shape. A slot 21 is provided on the inside edge of the plate 20, which slot 21 is rectangular in shape and extends about halfway into the plate 20. The region between the inner end of the slot 21 and the periphery of the plate 20 defines a web 22 which serves to rigidify the plate 20. Formed respectively on the sides of the slot 21 are two holes 23 spaced to mount a razor blade by the use of sheet metal screws. The purpose of such a razor blade will be described hereinafter. Respectively formed on the outer ends of the stripper plate 20 and also centrally thereon are three flanges 24 bent so to depend from the plane of the stripper plate 20. These flanges are secured to the top of the cylindrical outer surface of the can 15 by means of sheet metal screws 25. The planar bottom surface of the stripper plate 20 defines an abutment 26 against which fruit may engage.

There is also provided a bottom wall 30 which may be a plastic cover having an annular skirt 31 which snap fits onto an open end of the can 15. The bottom wall 30 is held securely in place by means of pieces of wire 32 passing through aligned openings in the bottom wall and in the bottom of the can 15 and bent into the shape shown. To enable an individual to view the inside of the can 15 while it is being raised in position to encompass a piece of fruit the bottom wall 30 may be of a transparent material. Alternatively the bottom wall 30 could be integral with the can 15 such as is the case with a standard can having one end open.

On the back of the can 15 and extending substantially parallel to the axis thereof is a handle 40 secured into place by means of screws 41 and nuts 42. Recesses 43 may be provided in the handle 40 to countersink the nuts 42. A pole of at least 2 or 3 feet in length and as long as 20 or 25 feet may be secured to the bottom of the handle 40 by means of screws 45 and nuts 46. Here also, the nuts 46 may be countersunk into recesses 47 formed in the pole 44.

In use, an individual selects an apple 11 to be picked, and then grasps the pole 44 as shown in FIG. 1, raising the can 15 such that the open end 16 thereof is in alignment with the apple 11. The process of aligning an apple 11 with the can 15 and causing it to enter same is facilitated by the transparent bottom wall 30. The fruit picker 10 is then raised further to enable the apple 11 to enter the space between the inside surface 17 and the inner edge of the stripper plate 20. The fruit picker 10 is moved laterally forwardly so that the stem 12 of the apple 11 enters the slot 21, preferably contacting the interior end of the slot 21. The user then pulls downwardly on the pole 44 so that the apple 11 bears against the abutment 26 of the stripper plate 20. After the downward force has reached a sufficient value, the upper end of the stem 12 will separate from the branch, whereupon the apple 11, with the stem 12 attached, will drop into the can 15. The web 22 rigidifies the stripper plate 20 to prevent deformation thereof during the separating operation. Preferably the can 15 is large enough to hold at least three apples, so that the user can then carry out the same sequence of steps to obtain additional apples. The user than lowers the can 15 to remove the fruit contained therein by, for example, pouring them into a bushel basket. The stripper plate 20 if on the lower side of the open end of the can 15 will assist in preventing the fruit from falling out while the can 15 is being lowered.

Although the opening defined by the can 15 and the stripper plate 20 may be so positioned as to be in front of the handle 40 as explained above, it should be understood that said opening can be to the rear, in which case the can 15 after being in position to encompass the piece of fruit is moved upwardly until the stem 12 is located within the slot 21. Which of the alternative positions is used, depends upon the foliage, the object being to use that position which minimizes the amount of foliage which enters the can 15.

Although the slot 21 has been described as being rectangular in shape, since this has been proven to be the most effective as far as retaining the stem 12 therein, it should be understood that other shaped slots are contemplated. The inside surface 17 of the can 15 serves to limit swinging movement of the fruit and therefore facilitate proper entry of the stem 12 into the slot 21. The curved inside edge of the stripper plate 20 serves to guide the apple 11 to the position where the stem 12 can enter the slot 21.

Although the above explanation has been with respect to apples, it should be understood that almost any variety of tree grown fruit such as apples, pears, peaches, apricots, etc., may be separated using the fruit picker 10.

In certain situations, it may be desired to sever the fruit from the tree rather than forcibly pulling same off. This is particularly true in separating grapes where the vines are peculiarly susceptible to damage. In that case, a razor blade is secured to the stripper plate 20 in the manner previously described, with the severing edge extending substantially normal to the sides of the slot 21. When it is desired to separate a bunch of grapes, the operation explained above with respect to picking of apples is carried out. However, in this case, the forward and downward movement of the fruit picker 10 will cause the severing edge of the blade to sever a vine to permit the bunch to fall into the container 15.

The can 15 may be of the coffee variety or if a larger can is desired to accommodate picking of larger or more fruit, an industrial size can may be used. In an operative form of the invention, a can having about a 5-inch diameter and 6½-inch height was used; the width of the slot was three-eighths inch; the depth of the slot was 1 inch; the depth of the web 22 was one-half inch; the handle 40 was a piece of 1×2-inch wood; and the pole 44 was a broom handle.

The stripper plate 20, a set of screws 25, a set of screws 41 and 45, a set of nuts 42 and 46 may be sold in kit form. The purchaser provides his own can 15, makes a handle 40, provides a pole 44 and assembles the kit and these latter-mentioned parts according to directions coming with the kit. The pole 44 may of course take a variety of forms depending upon how long it is desired to be. It may consist of a number of separate segments secured together by screws or perhaps a number of segments folded in much the same manner as a folding rule.

A second form of the invention is shown in FIG. 6 wherein parts corresponding to parts of FIGS. 2 to 5 are labeled with the same reference numerals, but primed. In this form, the stripper means 50 includes a pair of relatively rigid wires 51 and 52 twisted at one end thereof to form a Y. The three legs of the Y are secured to holes formed in the top of the can 15, the juncture of two of the legs forming a V-shaped slot 53. In this form, the piece of fruit enters the can 15 between the two longer legs of the stripper means 50. When tilted forward and pulled downwardly the stem 12 of the slot enters the V-shaped slot 53. Continued downward movement causes separation in the manner previously described.

While preferred embodiments of the fruit picker have been shown and described for illustrative purposes, it will be understood that various modifications may be made therein, and it is intended to cover in the appended claims all such modifications as fall within the true spirit and scope of the invention.

What is claimed is:

1. A fruit picker comprising a substantially cylindrical sidewall, a crescent-shaped plate disposed substantially normal to said sidewall and secured thereto at one end thereof, the outer edge of said plate substantially conforming to the curvature of said sidewall, the inner edge of said plate being substantially smooth and defining with the opposing edge of said sidewall an opening for receiving a piece of fruit, said plate having at the widest portion thereof a slot for receiving the stem of the piece of fruit, the underside of said plate defining an abutment for engaging the piece of fruit, a transparent wall on the end of said sidewall opposite said plate, and an elongated handle having an axis disposed substantially normal to said plate and substantially parallel to the axis of said cylindrical sidewall, said handle being secured to said sidewall adjacent to said slot, said fruit picker in use being raised to encompass a piece of fruit while the user is viewing the interior thereof through said transparent wall and then being moved forwardly away from the user to place the stem of the piece of fruit in said slot and finally pulling down to separate the piece of fruit and permit it to fall into said fruit picker.

* * * * *